(12) United States Patent
Klemann et al.

(10) Patent No.: US 11,504,728 B2
(45) Date of Patent: Nov. 22, 2022

(54) ACTIVE SUBSTANCE SUPPLY SYSTEM FOR AN AGRICULTURAL SPRAYER

(71) Applicant: Amazonen-Werke H. Dreyer GmbH & Co. KG, Hasbergen (DE)

(72) Inventors: Timo Klemann, Belm (DE); Christoph Kühn, Bad Iburg (DE); Achim Dembeck, Osnabrück (DE); Johannes Feldhaus, Åkarp (SE); Helmke Kalkmann, Osnabrück (DE); Mathias Stiegemeyer, Lotte (DE); Stefan Austermann, Telgte (DE)

(73) Assignee: Amazonen-Werke H. Dreyer SE & Co. KG

( * ) Notice: Subject to any disclaimer, the term of this patent is extended or adjusted under 35 U.S.C. 154(b) by 208 days.

(21) Appl. No.: 16/762,622

(22) PCT Filed: Nov. 2, 2018

(86) PCT No.: PCT/EP2018/079976
§ 371 (c)(1),
(2) Date: May 8, 2020

(87) PCT Pub. No.: WO2019/091858
PCT Pub. Date: May 16, 2019

(65) Prior Publication Data
US 2020/0276600 A1 Sep. 3, 2020

(30) Foreign Application Priority Data
Nov. 10, 2017 (DE) ..................... 10 2017 126 350.0

(51) Int. Cl.
*B05B 7/04* (2006.01)
*B05B 7/06* (2006.01)
*A01M 7/00* (2006.01)

(52) U.S. Cl.
CPC ............ *B05B 7/0408* (2013.01); *B05B 7/061* (2013.01); *A01M 7/005* (2013.01)

(58) Field of Classification Search
CPC ....... B05B 7/0408; B05B 7/061; A01M 7/005
(Continued)

(56) References Cited

U.S. PATENT DOCUMENTS

| 5,971,294 A | * | 10/1999 | Thompson | .............. | B05B 12/04 |
| | | | | | 239/69 |
| 6,189,807 B1 | * | 2/2001 | Miller | ..................... | B05B 12/04 |
| | | | | | 239/170 |

(Continued)

FOREIGN PATENT DOCUMENTS

| DE | 298 722 A5 | 3/1992 |
| DE | 11 2014 002 765 T5 | 3/2016 |

(Continued)

OTHER PUBLICATIONS

International Search Report dated Mar. 1, 2019 in corresponding PCT Application No. PCT/EP2018/079976.
(Continued)

*Primary Examiner* — Steven J Ganey
(74) *Attorney, Agent, or Firm* — Mintz, Levin, Cohn, Ferris, Glovsky and Popeo, P.C.

(57) ABSTRACT

An active substance supply system for an agricultural sprayer has a main liquid circuit which includes a reservoir for a main liquid and permits circulation of the main liquid, where the main liquid circuit includes one or more distribution sections which are each configured to distribute to several dispensing elements a spray liquid to be dispensed, and a feed system which is connected to the main liquid circuit and in which the main liquid is mixed with at least one separately supplied active substance to form a liquid active substance mixture, where the active substance supply
(Continued)

Figure 1:
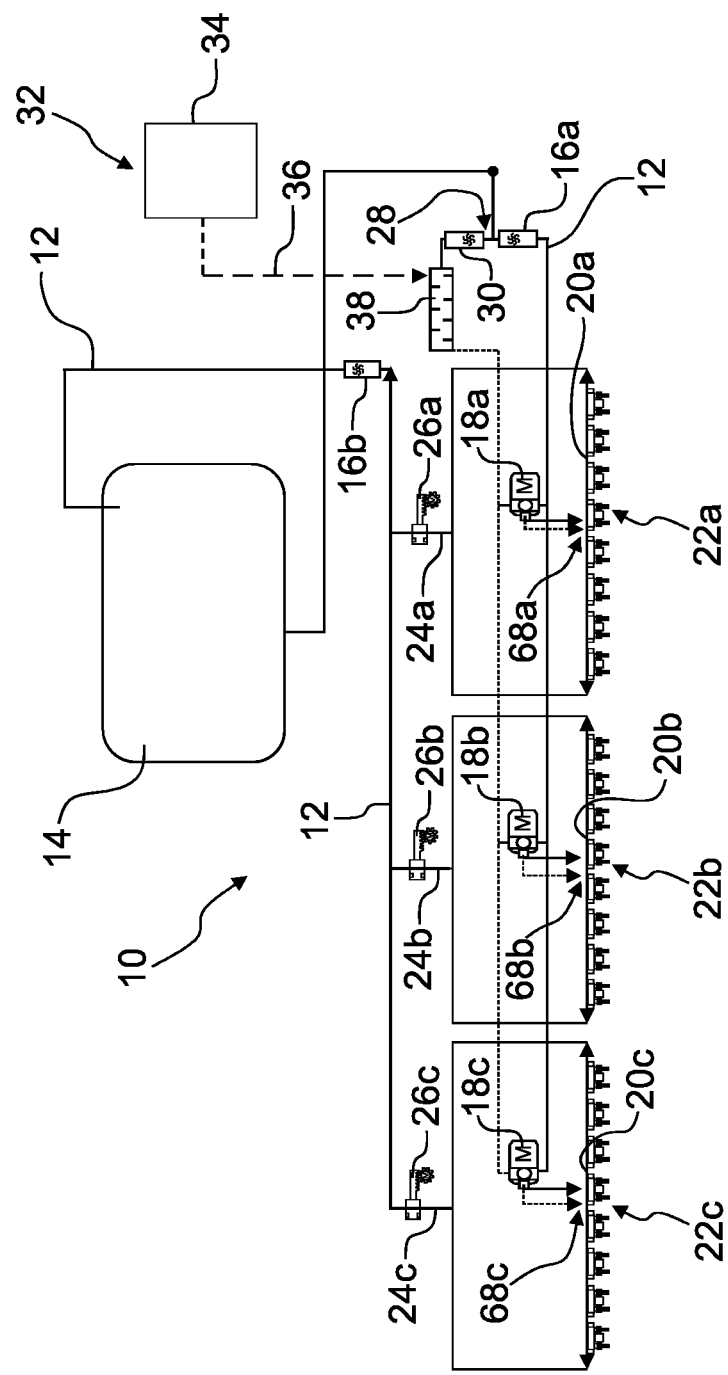

system is configured to introduce the active substance mixture into the one or more distribution sections at several places.

20 Claims, 2 Drawing Sheets

(58) Field of Classification Search
USPC ...... 239/1, 69, 159–163, 170, 172, 407, 408
See application file for complete search history.

(56) References Cited

U.S. PATENT DOCUMENTS

| | | | |
|---|---|---|---|
| 2012/0241533 A1* | 9/2012 | Moeller | A01M 7/0089 239/1 |
| 2014/0263705 A1* | 9/2014 | Michael | A01G 25/16 239/159 |

FOREIGN PATENT DOCUMENTS

| | | |
|---|---|---|
| EP | 1 932 423 A1 | 6/2008 |
| FR | 2 835 449 A1 | 8/2003 |
| WO | 2005/048704 A2 | 6/2005 |

OTHER PUBLICATIONS

Written Opinion of the International Searching Authority dated Mar. 1, 2019 in corresponding PCT Application No. PCT/EP2018/079976.

\* cited by examiner

ACTIVE SUBSTANCE SUPPLY SYSTEM FOR AN AGRICULTURAL SPRAYER

The invention relates to an active substance supply system for an agricultural sprayer according to the preamble of claim 1, an agricultural sprayer according to the preamble of claim 12, and a method for dispensing a spray liquid according to the preamble of claim 13.

Agricultural sprayers are known for dispensing spray liquid onto agricultural land and operate with a so-called direct feed system with which active substances can be partially dispensed. Respective direct feed systems permit the addition of active substance to a main liquid during the dispensing process, so that the need for stockpiling large quantities of a liquid active substance mixture composed of the main liquid and the active substance is not necessary. Direct feed systems also permit the adjustment of the quantity of active substance and therefore the adjustment of the mixing ratio of the spray liquid to be dispensed during the dispensing process.

Generic active substance supply systems regularly operate with a main liquid circuit which comprises a reservoir for the main liquid and permits the main liquid to circulate. The main liquid circuit usually comprises one or more distribution sections, each of which is configured to distribute to several dispensing elements, such as spray nozzles, a spray liquid to be dispensed.

An active substance supply system operating according to the principle of direct feed is known, for example, from publication DE 10 2004 047 585 A1. The publication proposes the use of a premix container in which the active substances are pre-diluted with the main liquid. The pre-diluted active substance mixture is then conveyed to the linkage and again mixed with the main liquid to form the spray broth to be dispensed.

In addition, publication DE 10 2006 059 193 A1 describes a system for direct feed of active substances into a main liquid already conveyed to the linkage. The active substances are pre-diluted and then diluted in a mixing chamber with the carrier liquid to the desired concentration.

Publication DE 10 2006 045 450 A1 also describes that the circulation of liquid within the linkage can be used for faster distribution of the active substance via the linkage.

With regard to direct feed, however, there is still the problem that a so-called delay period arises until the fed active substance or the desired liquid active substance mixture is present at all dispensing elements. Due to the longer flow path, the liquid active substance mixture is first present at the dispensing elements that are at the shortest distance from the feed point. With increasing distance of a dispensing element from the feed point, the delay increases until the desired active substance mixture is present at the respective dispensing element.

The object of the present invention is therefore to reduce the delay time of active substance supply systems having a direct feed, so that added active substance is present at the dispensing elements more rapidly.

The object is satisfied with an active substance supply system of the type mentioned above, where the active substance supply system according to the invention is configured to introduce the active substance mixture into the one or more distribution sections at several places.

The invention makes use of the realization that the flow paths for the active substance mixture, for example, to external dispensing elements, are significantly shortened when the active substance mixture is introduced at several places into the one or more distribution sections. Due to this shortening of the flow paths, the active substance mixture is already present at all dispensing elements after a shorter period of time, so that the delay time is significantly reduced.

The distribution sections can be, for example, the partial widths of a sprayer, each of which comprises a group of dispensing elements. The dispensing elements can comprise, for example, spray nozzles or be formed as spray nozzles. The spray liquid to be dispensed can be either the main liquid, the liquid active substance mixture, or a mixed liquid which is created by remixing the main liquid and the liquid active substance mixture. Furthermore, the active substance supply system can be configured to introduce the main liquid into the one or the several distribution sections at several places. The main liquid can there be introduced into the one or more distribution sections at the same places as the active substance mixture. Alternatively or in addition, the main liquid can be introduced into the one or more distribution sections at different places than the active substance mixture.

In a particularly preferred embodiment of the active substance supply system according to the invention, the latter comprises several flow control units which are each connected to the main liquid circuit and the feed system and are configured to control the flow of the main liquid and the active substance mixture to a distribution section. The flow control units are preferably switching units, in particular adjustment valves, which open either the flow of the main liquid or alternatively the flow of the active substance mixture to a distribution section. The flow control units are in particular three-way ball valves.

In a further development of the active substance supply system according to the invention, the main liquid circuit comprises in the direction flow downstream of the one or more distribution sections one or more return lines which are connected to the reservoir, where a respective shut-off device is arranged at the one or more return lines and is configured to block the flow. By blocking the flow in the direction of the reservoir, it is possible to prevent the liquid active substance mixture from being conveyed back into the reservoir and mixing with the main liquid within the reservoir. If such mixing were to take place, then precise adaptation of the active substance mixture by varying the quantity of active substance added would no longer be possible. The one or more shut-off devices can be formed, for example, as two-way ball valves. Arranged between the return lines and the reservoir is preferably a manifold line so that only one line is to be led back to the reservoir.

In another embodiment of the active substance supply system according to the invention, a branching is present at the main liquid circuit and connects the main liquid circuit to a mixing chamber of the feed system in a manner conveying liquid. The mixing chamber of the feed system is connected to a dosing device for the active substance. The dosing device preferably comprises a dosing pump for the active substance. The main liquid is mixed with the active substance in the mixing chamber to form the liquid active substance mixture. The active substance supply system preferably comprises a respective flow meter between the branching and the mixing chamber, in the main liquid circuit between the branching and the one or more distribution sections and/or in the main liquid circuit between the one or more return lines and the reservoir. The quantity of liquid conveyed to the dispensing elements and the quantity of liquid conveyed back into the reservoir can be determined by the flow meters, so that the current dispensing quantity can be determined.

In a further embodiment of the active substance supply system according to the invention, the branching comprises a flow control unit which is configured to control the flow of the main liquid circulating in the main liquid circuit and/or the outflow of the main liquid circulating in the main liquid circuit to the mixing chamber. The flow control unit can be configured in such a way that the ratio of the flow of the main liquid circulating in the main liquid circuit and the outflow of the main liquid circulating in the main liquid circuit to the mixing chamber is adjustable. The flow control unit can also be formed as a switching unit, in particular an adjustment valve, which either permits the circulation of the main liquid in the main liquid circuit or alternatively redirects the main liquid from the main liquid circuit to the mixing chamber. The flow control unit is preferably a three-way ball valve. The active substance supply system preferably comprises a flow meter between a conveying device of the main liquid circuit and the flow control unit of the branching. The current dispensing quantity can be determined by comparing the flow rate toward the dispensing elements with the return quantity into the reservoir.

In a further development of the active substance supply system according to the invention, the latter comprises several flow control units whose inlets are each connected to the main liquid circuit and preferably not connected to the feed system and which are each configured to control the flow of the main liquid to a distribution section. The flow control units are preferably formed as valve units, in particular as check valves.

In another embodiment of the active substance supply system according to the invention, the latter comprises several flow control units whose inlets are each connected to the feed system and preferably not connected to the main liquid circuit and which are each configured to control the flow of the active substance mixture to a distribution section. The flow control units are preferably formed as valve units, in particular as check valves.

In addition, an active substance supply system according to the invention is preferred which comprises a circulation circuit for the active substance mixture that enables circulation of the active substance mixture. Due to the circulation circuit for the active substance mixture, an active substance mixture with the desired mixing ratio is present at the flow control units which are each connected to the feed system. The circulation within the circulation circuit is first used to create a homogeneous active substance mixture made up of the main liquid and the active substance. As soon as the homogeneous mixture of active substances has been created, the circulation of the active substance mixture within the circulation circuit prevents the active substances from segregating and depositing.

In another embodiment of the active substance supply system according to the invention, the circulation circuit to the reservoir and/or to the one or more distribution sections can be blocked. Blocking the circulation circuit to the reservoir prevents the active substance mixture from entering the reservoir and mixing with the main liquid. By the fact that the circulation circuit can be blocked from the one or more distribution sections, dispensing the active substance mixture can be interrupted without switching the dispensing elements. In addition, blocking the circulation circuit from the one or more distribution sections further enables dispensing pure main liquid, while an active substance mixture continues to circulate within the circulation circuit.

In an advantageous further development of the active substance supply system according to the invention, the circulation circuit and the main liquid circuit are completely separable from each other. The circulation circuit and the main liquid circuit each preferably comprise at least one separate conveying device, in particular a pump, so that the circulation within the circulation circuit does not depend on the circulation within the main liquid circuit. Alternatively, the circulation circuit and the main liquid circuit can be coupled to each other, for example, in such a way that the circulation circuit and the main liquid circuit exhibit common line sections. By suitably switching blocking devices, either a circulation within the circulation circuit or a circulation within the main liquid circuit can be realized in this case.

In addition, an active substance supply system according to the invention is further advantageous in which the circulation circuit comprises a conveying device and a bypass line bridging the conveying device. The bypass line inlet is arranged in the direction of flow downstream of the conveying device and the bypass outlet is arranged in the direction of flow upstream of the conveying device. The bypass line is preferably used for cleaning and/or emptying the circulation circuit.

The object underlying the invention is further satisfied with an agricultural sprayer of the type mentioned above, where the active substance supply system of the agricultural sprayer according to the invention is formed according to one of the embodiments described above. Regarding the advantages and modifications of the agricultural sprayer according to the invention, reference is made to the advantages and modifications of the active substance supply system according to the invention.

The object underlying the invention is further satisfied with a method for dispensing a spray liquid of the type mentioned above, where the method of the invention comprises the introduction of the active substance mixture into the one or more distribution sections at several places. Regarding the advantages and modifications of the method according to the invention, reference is first made to the advantages and modifications of the active substance supply system according to the invention.

The main liquid circuit preferably comprises at least one section of the distributor linkage, a plurality of dispensing elements, and/or at least one flow generator. The dispensing elements can there, for example, be formed as spray nozzles or each comprise spray nozzles.

In a preferred embodiment of the method according to the invention, the flow of the main liquid and the active substance mixture to a distribution section is controlled at the several places. Controlling the flow can comprise, for example, interrupting or opening the flow of main liquid and/or active substance mixture.

Furthermore, controlling the flow can also comprise adjusting a volume or mass flow of the main liquid and/or the active substance mixture.

In addition, a method according to the invention is preferred in which controlling the flow of the main liquid and the active substance mixture to a distribution section at several places is respectively effected with a switching unit, in particular an adjustment valve, which opens either the flow of the main liquid or alternatively the flow of the active substance mixture to a distribution section. In this way, either the main liquid or the active substance mixture can be introduced into the one or more distribution sections.

In a further development of the method according to the invention, controlling the flow of the main liquid and the active substance mixture to a distribution section at the several places is respectively effected with separate valves for the main liquid and the liquid active substance mixture. When using separate valves, different quantities of main liquid and/or active substance mixture can be supplied to the different distribution sections. Dispensing can be made even more flexible in this way.

In a particularly preferred embodiment of the method according to the invention, the latter comprises blocking the return flow of the main liquid circuit from the one or more distribution sections to the reservoir and/or opening the return flow of the main liquid circuit from the one or more distribution sections to the reservoir.

A method according to the invention is further preferred in which the active substance mixture circulates in a circulation circuit. The circulation within the circulation circuit is first used to create a homogeneous active substance mixture made up of the main liquid and the active substance. Once the homogeneous mixture has been created, the circulation of active the substance mixture within the circulation circuit prevents the active substances from segregating and depositing.

In another embodiment of the method according to the invention, one distribution section or several or all distribution sections are preloaded with the active substance mixture before their dispensing elements are opened. Preloading is there done in that the one or more shut-off devices at the return flow lines remain open and the flow control units supply active substance mixtures to the one distribution section or to the several or to all distribution sections until the active substance mixture is present at the dispensing elements of the one distribution section or the several or all distribution sections.

In addition, a method according to the invention is preferred in which the circulation circuit is preloaded with an active substance mixture before the flow from the circulation circuit to the one or more distribution sections is opened. Preloading is there done in that the circulation circuit is supplied active substance until the desired active substance mixture in the circulation circuit has been reached before the flow from the circulation circuit to the one or more distribution sections is opened.

In a further embodiment of the method according to the invention, the spray liquid to be dispensed is changed from the active substance mixture to pure main liquid, where, for changing the spray liquid to be dispensed from the active substance mixture to pure main liquid, the one or more shut-off devices at the return flow lines remain closed until all the active substance mixture has left the lines of the main liquid circuit.

The active substance mixture can also be dispensed at regular or irregular time intervals to prevent the active substance from depositing. Furthermore, in order to prevent deposits in the regions of the feed system and/or in the region of the circulation circuit, the main liquid can be introduced into the feed system and/or circulated within the circulation circuit if no active substance mixture is to be dispensed for a longer period of time. In addition, the circulation circuit can comprise its separate conveying device, in particular a pump, with which continuous circulation can be implemented, even if no active substance mixture is removed from the circulation circuit for dispensing. Furthermore, the circulation circuit can be in part or entirely emptied by the pump in the circulation circuit. For entirely emptying the circulation circuit, the latter preferably comprises a bypass line, where the bypass line inlet is arranged in the direction of flow downstream if the conveying device of the circulation circuit and the bypass outlet is arranged in direction of flow upstream of the conveying device of the circulation circuit. The bypass line can be used to clean and/or empty the circulation circuit.

Further details of the invention can be gathered from the description of the figures and the drawings, where FIG. 1 shows an embodiment of the active substance supply system according to the invention in a schematic representation; and FIG. 2 shows a further embodiment of the active substance supply system according to the invention in a schematic representation.

FIG. 1 shows an active substance supply system 10 for an agricultural sprayer. Active substance supply system 10 comprises a main liquid circuit 12 within which a main liquid, such as water or a premixed spray broth, circulates.

Main liquid circuit 12 comprises a reservoir 14 for the main liquid, two flow meters 16*a*, 16*b*, several flow control units 18*a*-18*c* and several distribution sections 20*a*-20*c*. Flow meter 16*a* is arranged between a branching 28 and distribution sections 20*a*-20*c*. Flow meter 16*b* is arranged between return lines 24*a*-24*c* and reservoir 14. Several flow control units 18*a*-18*c* are each connected to main liquid circuit 12 and a feed system 32, control the flow of the main liquid and an active substance mixture to distribution sections 20*a*-20*c*. The active substance mixture and the main liquid can be introduced into distribution sections 20*a*-20*c* at several places 68*a*-68*c*. Flow control units 18*a*-18*c* are formed as 3-way ball valves. Distribution sections 20*a*-20*c* each distribute to several dispensing elements 22*a*-22*c* spray liquid to be dispensed.

In the direction of flow downstream of distribution sections 20*a*-20*c*, main liquid circuit 12 comprises return lines 24*a*-24*c* which are connected to reservoir 14. Arranged at each return flow lines 24*a*-24*c* is a shut-off device 26*a*-26*c* which is formed as a 2-way ball valve with which the flow can be blocked. A manifold line is also arranged between return lines 24*a*-24*c* and reservoir 14.

Branching 28 is further present at main liquid circuit 12 and connects main liquid circuit 12 to a mixing chamber 38 of feed system 32 in a manner conveying liquid. Arranged between branching 28 and mixing chamber 38 is a flow meter 30. The main liquid is mixed with the active substance in mixing chamber 38 of feed system 32 to form a liquid active substance mixture. The active substance is fed via dosing pump 34 and line 36 to mixing chamber 38.

Active substance supply system 10 illustrated can be employed, for example, in an agricultural sprayer comprising a distributor linkage on which dispensing elements 22*a*-22*c* are arranged.

When spray liquid is dispensed, the main liquid circulates in main liquid circuit 12 of active substance supply system 10. The main liquid is mixed by feed system 32 with active substance to form a liquid active substance mixture and the active substance mixture is introduced into distribution sections 20*a*-20*c* at several places 68*a*-68*c*. Within distribution sections 20*a*-20*c*, the active substance mixture is distributed to dispensing elements 22*a*-22*c* which ultimately deliver the active substance mixture as a spray liquid onto agricultural land. The flow rate of the main liquid and the active substance mixture to distribution sections 20*a*-20*c* is controlled with flow control units 18*a*-18*c*.

Furthermore, distribution sections 20*a*-20*c* can be preloaded with the active substance mixture before their dispensing elements 22*a*-22*c* are opened. Preloading is done in that shut-off devices 26*a*-26*c* at return lines 24*a*-24*c* remain open and flow control units 18*a*-18*c* supply the active substance mixture to distribution sections 20*a*-20*c* until the active substance mixture is present at dispensing elements 22*a*-22*c* of distribution sections 20*a*-20*c*.

When changing the spray liquid to be dispensed from the active substance mixture to pure main liquid, shut-off devices 26a-26c remain closed at return lines 24a-24c until all the active substance mixture has left the lines of main liquid circuit 12.

Figure 2:
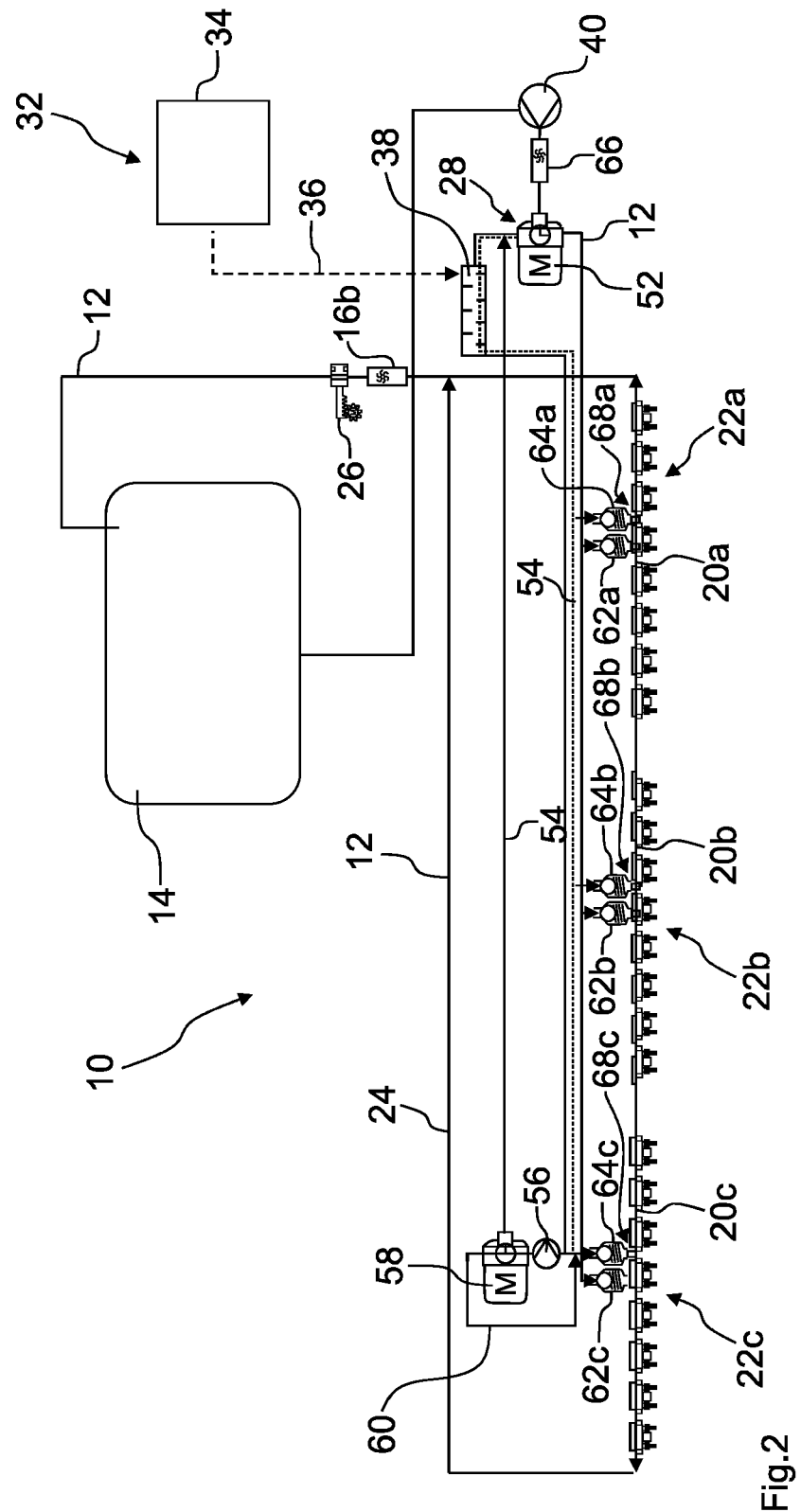

FIG. 2 shows an active substance supply system 10 with a main liquid circuit 12 and a circulation circuit 54.

In the flow direction upstream of distribution sections 20a-20c, main liquid circuit 12 comprises a return line 2 which is connected to reservoir 14, where a shut-off device 26 configured to block the flow is arranged at return line 24. Shut-off device 26 is configured as a 2-way ball valve.

A branching 28 is again present at main liquid circuit 12 and connects main liquid circuit 12 to a mixing chamber 38 of feed system 32 in a manner conveying liquid. Branching 28 in this embodiment comprises a flow control unit 52 which is configured to control the flow of the main liquid circulating in main liquid circuit 12 and/or the outflow of the main liquid circulating in main liquid circuit 12 to mixing chamber 38. Flow control unit 52 is a 3-way ball valve which either permits the circulation of the main liquid in main liquid circuit 12 or alternatively redirects the main liquid from main liquid circuit 12 to mixing chamber 38. A flow meter 66 is additionally arranged between a conveying device 40 of main liquid circuit 12 and flow control unit 52 of branching 28.

Furthermore, main liquid circuit 12 comprises several flow control units 62*a*-62*c* which each control the flow of the main liquid to a distribution section 20*a*-20*c*.

Circulation circuit 54 permits the circulation of the active substance mixture. Due to circulation circuit 54, an active substance mixture with the desired mixing ratio is present at flow control units 64*a*-64*c* which are each connected to feed system 32. Flow control units 64*a*-64*c* each control the flow of the active substance mixture to a distribution section 20*a*-20*c*. Circulation circuit 54 to reservoir 14 and distribution sections 20*a*-20*c* can be blocked. Furthermore, circulation circuit 54 and main liquid circuit 12 are completely separable from each other. In order to nevertheless maintain circulation, circulation circuit 54 and main liquid circuit 12 each comprise a separate conveying device 40, 56, each formed as a pump.

Circulation circuit 54 also comprises a bypass line 60 that bridges conveying device 56. The bypass line inlet is arranged in the flow direction downstream of conveying device 56 and the bypass outlet is arranged in the flow direction upstream of conveying device 56. The integration of bypass line 60 is controlled by flow control unit 58 which is configured as a 3-way ball valve. Bypass line 60 is used for cleaning and emptying circulation circuit 54.

The active substance supply system illustrated can also be employed in an agricultural sprayer comprising a distributor linkage on which dispensing elements 22*a*-22*c* are arranged.

LIST OF REFERENCE NUMERALS

10 active substance supply system
12 main liquid circuit
14 reservoir
16*a*, 16*b* flow meters
18*a*-18*c* flow control units
20*a*-20*c* distribution sections
22*a*-22*c* groups of dispensing elements
24, 24*a*-24*c* return lines
26, 26*a*-26*c* shut-off devices
28 branchings
30 flow meter
32 feed system
34 dosing pump
36 line
38 mixing chamber
40 conveying device
52 flow control unit
54 circulation circuit
56 conveying device
58 flow control unit
60 bypass line
62*a*-62*c* flow control units
64*a*-64*c* flow control units
66 flow meter
68*a*-68*c* introduction points

The invention claimed is:

1. Active substance supply system for an agricultural sprayer, comprising:

a main liquid circuit which comprises a reservoir for a main liquid and permits circulation of said main liquid, where said main liquid circuit comprises one or more distribution sections which are each configured to distribute to several dispensing elements a spray liquid to be dispensed, and a feed system which is connected to said main liquid circuit and in which said main liquid is mixed with at least one separately fed active substance to form a liquid active substance mixture;

wherein said active substance supply system is configured to introduce said liquid active substance mixture into said one or more distribution sections at several places, and wherein a branching is present at said main liquid circuit and connects said main liquid circuit to a mixing chamber of said feed system in a manner conveying liquid.

2. Active substance supply system according to claim 1, further comprising several flow control units which are each connected to said main liquid circuit and said feed system and are configured to control the flow of said main liquid and said liquid active substance mixture to a distribution section.

3. Active substance supply system according to claim 1, wherein said main liquid circuit comprises in the direction of flow downstream of said one or more distribution sections one or more return lines which are connected to said reservoir, where a respective shut-off device is arranged at said one or more return lines and is configured to block the flow.

4. Active substance supply system according to claim 1, wherein said branching comprises a flow control unit which is configured to control the flow of said main liquid circulating in said main liquid circuit or the outflow of said main liquid circulating in said main liquid circuit to said mixing chamber.

5. Active substance supply system according to claim 1, further comprising several flow control units having inlets each connected to said main liquid circuit and not to said feed system and which are each configured to control the flow of said main liquid to a distribution section.

6. Active substance supply system according to claim 1, further comprising several flow control units having inlets each connected to said feed system and not to said main liquid circuit and which are each configured to control the flow of said liquid active substance mixture to a distribution section.

7. Active substance supply system according to claim 1, further comprising a circulation circuit for said liquid active substance mixture which permits circulation of said liquid active substance mixture.

8. Active substance supply system according to claim 7, wherein said circulation circuit to said reservoir or to said one or more distribution sections is configured to be blocked.

9. Active substance supply system according to claim 7, wherein said circulation circuit and said main liquid circuit are entirely separable from each other.

10. Active substance supply system according to claim 7, wherein said circulation circuit comprises a conveying device and a bypass line bridging said conveying device.

11. Agricultural sprayer, comprising:
a distributor linkage on which several dispensing elements are arranged; and
an active substance supply system which provides said dispensing elements with a spray liquid to be dispensed;
wherein said active substance supply system comprises:
a main liquid circuit which comprises a reservoir for a main liquid and permits circulation of said main liquid, where said main liquid circuit comprises one or more distribution sections which are each configured to distribute to said several dispensing elements the spray liquid to be dispensed, and a feed system which is connected to said main liquid circuit and in which said main liquid is mixed with at least one separately fed active substance to form a liquid active substance mixture, and where said main liquid circuit is connected to a mixing chamber of said feed system by means of a branching present at said main liquid circuit in a manner conveying liquid;
wherein said active substance supply system is configured to introduce said liquid active substance mixture into said one or more distribution sections at several places.

12. Method for conveying a spray liquid with an agricultural sprayer, comprising the steps of:
circulating a main liquid in a main liquid circuit of an active substance supply system of said agricultural sprayer, said main liquid circuit comprising a reservoir for a main liquid,
distributing to several dispensing elements in one or more distribution sections of said main liquid circuit a spray liquid to be dispensed,
mixing main liquid with an active substance to form a liquid active substance mixture in a feed system of said active substance supply system of said agricultural sprayer, the main liquid circuit being connected to a mixing chamber of said feed system by means of a branching present at said main liquid circuit in a manner conveying main liquid; and
introducing said liquid active substance mixture into said one or more distribution sections at several places.

13. Method according to claim 12, further comprising the step of:
controlling the flow of said main liquid and said liquid active substance mixture to a distribution section at said several places.

14. Method according to claim 13, wherein controlling the flow of said main liquid and said liquid active substance mixture to a distribution section at said several places is respectively effected by an adjustment valve, which opens either the flow of said main liquid or alternatively the flow of said liquid active substance mixture to a distribution section.

15. Method according to claim 13, wherein controlling the flow of said main liquid and said liquid active substance mixture to a distribution section at said several places is respectively effected with separate valves for said main liquid and said liquid active substance mixture.

16. Method according to claim 12, further comprising the steps of:
blocking the return flow of said main liquid circuit from said one or more distribution sections to said reservoir;
opening the return flow of said main liquid circuit from said one or more distribution sections to said reservoir.

17. Method according to claim 12, further comprising the step of:
circulating said liquid active substance mixture in a circulation circuit.

18. Method according to claim 17, further comprising the step of:
preloading said circulation circuit with said active substance mixture before the flow from said circulation circuit to said one or more distribution sections is opened.

19. Method according to claim 12, further comprising the step of:
preloading one distribution section, several or all distribution sections with said liquid active substance mixture before their dispensing elements are opened.

20. Method according to claim 12, further comprising the step of:
changing said spray liquid to be dispensed from the active substance mixture to pure main liquid,
wherein, for changing said spray liquid to be dispensed from the active substance mixture to pure main liquid, said one or more shut-off devices remain closed at said return lines until all the active substance mixture has left the lines of said main liquid circuit.

* * * * *